(12) United States Patent
Sung et al.

(10) Patent No.: US 11,912,603 B2
(45) Date of Patent: Feb. 27, 2024

(54) GLASS ARTICLE AND METHOD FOR FABRICATING THE SAME

(71) Applicant: Samsung Display Co., LTD., Yongin-si (KR)

(72) Inventors: Su Jin Sung, Hwaseong-si (KR); Byung Hoon Kang, Hwaseong-si (KR); Seung Kim, Seongnam-si (KR); Young Ok Park, Seoul (KR); Gyu In Shim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 437 days.

(21) Appl. No.: 17/144,798

(22) Filed: Jan. 8, 2021

(65) Prior Publication Data

US 2021/0323855 A1  Oct. 21, 2021

(30) Foreign Application Priority Data

Apr. 21, 2020 (KR) .................. 10-2020-0047933

(51) Int. Cl.
| | |
|---|---|
| *B32B 15/04* | (2006.01) |
| *B32B 17/06* | (2006.01) |
| *C03B 18/02* | (2006.01) |
| *C03C 21/00* | (2006.01) |

(52) U.S. Cl.
CPC ............ *C03B 18/02* (2013.01); *C03C 21/002* (2013.01)

(58) Field of Classification Search
CPC .................................................. C03C 21/002
USPC .................................................. 428/410, 426
See application file for complete search history.

(56) References Cited

U.S. PATENT DOCUMENTS

| | | | | |
|---|---|---|---|---|
| 3,287,200 | A * | 11/1966 | Hess ..................... | C03C 21/002 65/30.14 |
| 4,671,814 | A * | 6/1987 | Aratani ................. | C03C 21/002 65/99.2 |
| 10,273,184 | B2 * | 4/2019 | Garner .................. | B32B 17/061 |
| 10,781,135 | B2 * | 9/2020 | Weber ................... | C03C 21/002 |
| 2003/0037569 | A1 * | 2/2003 | Arbab ..................... | C03C 17/04 65/93 |
| 2012/0236526 | A1 * | 9/2012 | Weber ................... | C03C 21/002 65/30.14 |
| 2017/0015584 | A1 * | 1/2017 | Krzyzak ................. | C03C 17/00 |
| 2017/0088454 | A1 | 3/2017 | Fukushima et al. | |
| 2017/0334769 | A1 * | 11/2017 | Luzzato .................... | C03C 4/18 |

(Continued)

FOREIGN PATENT DOCUMENTS

| | | |
|---|---|---|
| JP | 2015187070 A | 10/2015 |
| KR | 101194245 B1 | 10/2012 |

*Primary Examiner* — Lauren R Colgan
(74) *Attorney, Agent, or Firm* — CANTOR COLBURN LLP

(57) ABSTRACT

A glass article includes a first surface; a second surface opposed to the first surface; a side surface connecting the first surface to the second surface; a first surface compressive region extending from the first surface to a first depth; a second surface compressive region extending from the second surface to a second depth; and a side compressive region extending from the side surface to a third depth, where the first surface and the side surface are non-tin surfaces, the second surface is a tin surface, and a maximum compressive stress of the second surface compressive region is greater than a maximum compressive stress of the first surface compressive region.

12 Claims, 24 Drawing Sheets

(56) References Cited

U.S. PATENT DOCUMENTS

| | | | | |
|---|---|---|---|---|
| 2017/0334770 A1* | 11/2017 | Luzzato | ............... | C03C 17/23 |
| 2018/0370852 A1* | 12/2018 | Navet | ............... | C03C 21/002 |
| 2019/0023611 A1* | 1/2019 | Luzzato | ............... | C03C 21/002 |
| 2019/0112220 A1* | 4/2019 | Alder | ............... | C03C 21/002 |
| 2019/0161401 A1* | 5/2019 | Kuang | ............... | C03C 21/002 |
| 2019/0330103 A1* | 10/2019 | Ozeki | ............... | C03C 3/091 |
| 2020/0299186 A1* | 9/2020 | Alder | ............... | C03C 21/008 |
| 2021/0179488 A1* | 6/2021 | Sung | ............... | G02F 1/133331 |

* cited by examiner

GLASS ARTICLE AND METHOD FOR FABRICATING THE SAME

This application claims priority to Korean Patent Application No. 10-2020-0047933 filed on Apr. 21, 2020, and all the benefits accruing therefrom under 35 U.S.C. § 119, the content of which in its entirety is herein incorporated by reference.

BACKGROUND

1. Technical Field

The present disclosure relates to a glass article and a method for fabricating the same.

2. Description of the Related Art

A glass article is widely used in an electronic device or a construction material including a display device. For example, the glass article is applied to a substrate of a flat panel display device such as a liquid crystal display ("LCD"), an organic light emitting diode ("OLED") and an electrophoretic display ("EPD"), or a window protecting the same.

As a portable electronic device such as a smart phone and a tablet PC have become popular, the glass article applied to the portable electronic device is frequently exposed to external impacts. Accordingly, it is desirable to develop a glass article which is thin for portability and has good strength to withstand external impacts.

Plate-shaped glass may be fabricated by a process such as a float process, a fusion draw process, a slot draw process or the like. The fusion draw process or the slot draw process has a disadvantage in that the fabrication cost is higher than the float process. Therefore, in recent years, research has been conducted to fabricate glass that is thin and has improved impact resistance through the float process.

SUMMARY

Aspects of the present disclosure provide a glass article that is thin and has excellent impact resistance while including float glass fabricated by a float process.

Aspects of the present disclosure also provide a method for fabricating a glass article, which is thin and has excellent impact resistance, using glass fabricated through a float process.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

An embodiment of a glass article includes a first surface; a second surface opposed to the first surface; a side surface connecting the first surface to the second surface; a first surface compressive region extending from the first surface to a first depth; a second surface compressive region extending from the second surface to a second depth; and a side compressive region extending from the side surface to a third depth, where the first surface and the side surface are non-tin surfaces, the second surface is a tin surface, and a maximum compressive stress of the second surface compressive region is greater than a maximum compressive stress of the first surface compressive region.

An embodiment of a method for fabricating a glass article includes molding a glass having a tin surface by floating a molten glass raw material above molten tin; forming a protective layer on the tin surface of the molded glass; cutting the glass to a predetermined size; three-dimensionally machining a non-tin surface opposed to the tin surface, where the protective layer is formed on the tin surface; primarily polishing the glass; removing the protective layer; and chemically strengthening the glass from which the protective layer has been removed.

According to the glass article and the method for fabricating the same in accordance with an exemplary embodiment, it is possible to fabricate the glass article, which is thin, has excellent impact resistance and is capable of preventing the occurrence of warpage due to stress imbalance in both surfaces of the glass article, even in the case of using float glass.

The effects of the present disclosure are not limited to the aforementioned effects, and various other effects are included in the present specification.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
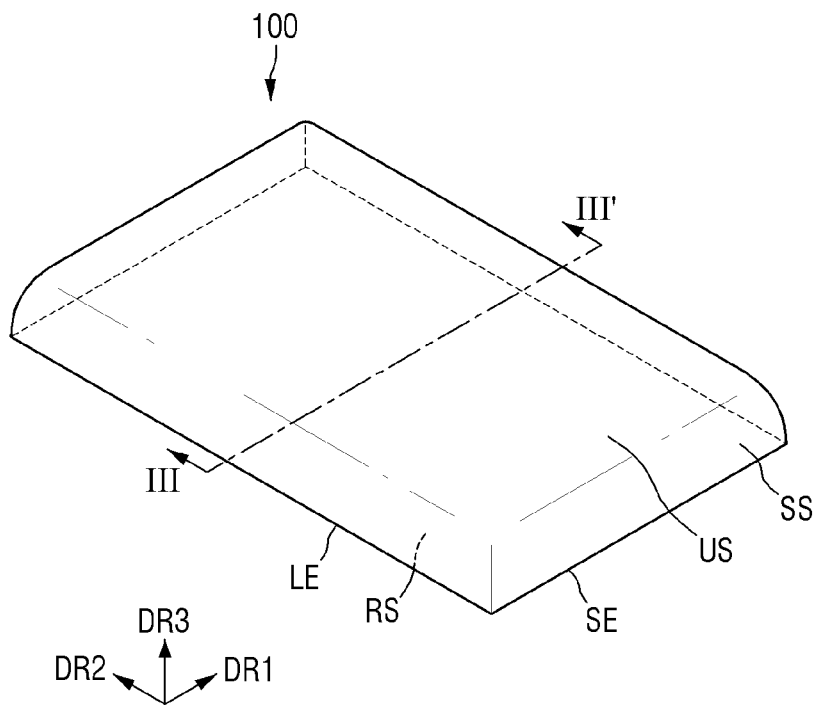
FIG. 1 is a perspective view of a glass article according to an exemplary embodiment.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art.

It will also be understood that when a layer is referred to as being "on" another layer or substrate, it can be directly on the other layer or substrate, or intervening layers may also be present. In contrast, when an element is referred to as being "directly on" another element, there are no intervening elements present. It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The same reference numbers indicate the same components throughout the specification.

As used herein, the term "glass article" refers to an article made entirely or partially of glass.

Hereinafter, exemplary embodiments of the present disclosure will be described with reference to the accompanying drawings.

FIG. 1 is a perspective view of a glass article according to an exemplary embodiment. Three directions are shown in FIG. 1. A first direction DR1 and a second direction DR2 are directions parallel to sides of a glass article 100, respectively, are orthogonal to each other, and defines a major surface plane of the glass article 100. A third direction DR3 is a direction perpendicular to the plane and indicates the thickness direction of the glass article 100.

Referring to FIG. 1, the glass article 100 is used as an optical member or the like such as a substrate for a display panel, a substrate for a touch panel, a light guiding plate and a cover window for protecting a display in an electronic device having the display, such as a refrigerator and a washing machine which have display screens as well as a tablet PC, a notebook PC, a smart phone, an electronic book, a television, and a PC monitor. The glass article 100 may also be employed as a cover glass for a dashboard of a vehicle, a cover glass for solar cells, interior materials for construction materials, windows for buildings and houses, and the like.

Some glass articles 100 may be required to have a strong strength. For example, in a case of the glass article 100 applied to the cover window, it is preferable that the glass article 100 has enough strength not to be easily damaged by external impacts while having high transmittance and a thin thickness to satisfy a requirement of light weight. Strengthened glass can be produced by, for example, chemical strengthening or thermal strengthening.

In an exemplary embodiment, the glass article 100 may have a three-dimensional shape that includes curved portions. The glass article 100 may include a first surface US (i.e., upper surface or front surface) located on one side of the third direction DR3, a second surface RS (i.e., bottom surface or rear surface) opposed to the first surface US and located on the other side of the third direction DR3, and side surfaces SS connecting the first surface US to the second surface RS in side regions. Here, the first surface US and the second surface RS may correspond to the major surface plane of the glass article 100 defined by the first direction DR1 and the second direction DR2. The side surfaces SS may be inclined with respect to the first surface US and the second surface RS. The inclination angle of the side surface SS may be defined with respect to each of the first surface US and the second surface RS. The inclination angle of the side surface SS measured with respect to the first surface US may be defined as an angle formed by a tangent line at a point where the first surface US and the side surface SS meet. The inclination angle of the side surface SS measured with respect to the second surface RS may be defined as an angle formed by a tangent line at a point where the second surface RS and the side surface SS meet. For example, the side surface SS may have an inclination angle of an obtuse angle with respect to the first surface US, and have an inclination angle of an acute angle with respect to the second surface RS. All side surfaces SS may have the same inclination, and in this case, the area of the first surface US may be smaller than that of the second surface RS.

The inclined side surfaces SS may include curved surfaces. For example, in the cross-section of the side surfaces SS, the side surface SS may connect the first surface US and the second surface RS, while having an outwardly convex shape.

In some embodiments, at least some of the side surfaces SS may have a perpendicular planar shape. For example, the side surfaces SS located on long sides LE may have an inclined curved shape, while the side surfaces SS located on short sides SE may be the perpendicular planar surfaces. In the following embodiments, the glass article 100 including the side surfaces SS, all of which have the inclined curved shape, is described as an example, but it is obvious that the present disclosure is not limited thereto. The inclined side surfaces SS may be formed by three-dimensional machining, which will be described later. Details of each of the surfaces US, RS and SS of the glass article 100 will be described later with reference to FIG. 3.

Figure 2:
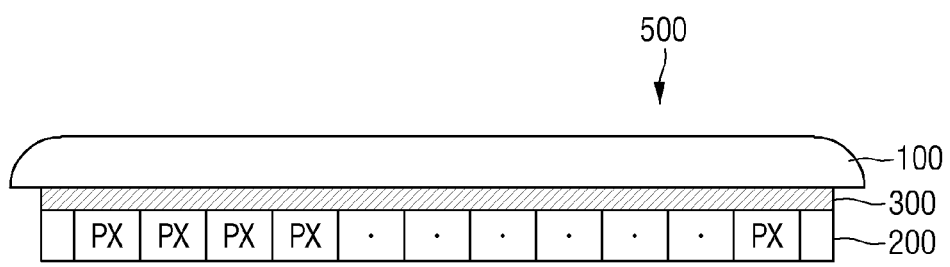
FIG. 2 is a cross-sectional view illustrating an example in which a glass article according to an exemplary embodiment is applied to a cover window of a display device.

FIG. 2 is a cross-sectional view illustrating an example in which a glass article according to an exemplary embodiment is applied as a cover window of a display device.

Referring to FIG. 2, a display device 500 may include a display panel 200, a cover window (glass article) 100 disposed on the display panel 200, and an optically transparent bonding layer 300 disposed between the display panel 200 and the glass article 100 to bond the display panel 200 and the glass article 100 to each other.

Examples of the display panel 200 may include not only a self-luminous display panel such as an organic light emitting display ("OLED") panel, an inorganic electroluminescence ("EL") display panel, a quantum dot ("QED") display panel, a micro-light emitting diode ("LED") display panel, a nano-LED display panel, a plasma display panel ("PDP"), a field emission display ("FED") panel and a cathode ray tube ("CRT") display panel, but also a light receiving display panel such as a liquid crystal display ("LCD") panel and an electrophoretic display ("EPD") panel.

The display panel 200 includes a plurality of pixels PX and may display an image by using light emitted from each pixel PX. The display device 500 may further include a touch member (not shown). In an exemplary embodiment, the touch member may be embedded in the display panel 200. For example, since the touch member is directly disposed on a display member of the display panel 200, the display panel 200 itself may perform a touch function. In another embodiment, the touch member may be manufactured separately from the display panel 200 and then attached to the top surface of the display panel 200 by an optically transparent bonding layer.

The glass article 100 is disposed on the display panel 200. The glass article 100 serves as the cover window to protect the display panel 200 from the top of the display panel 200. Since the glass article 100 is larger in size than the display panel 200, the side surface of the glass article 100 may protrude outward from the side surface of the display panel 200 in a plan view (i.e., view from the third direction DR3), but the invention is not limited thereto. The display device 500 may further include a printed layer disposed on at least one surface of the glass article 100 at an edge portion of the glass article 100. The printed layer may prevent the bezel area of the display device 500 from being visible from the outside, and may perform a decoration function in some cases.

The optically transparent bonding layer 300 is disposed between the display panel 200 and the glass article 100. The optically transparent bonding layer 300 serves to fix the glass article 100 onto the display panel 200. The optically transparent bonding layer 300 may include an optically clear adhesive ("OCA"), an optically clear resin ("OCR"), or the like.

Hereinafter, the strengthened glass article 100 will be described in more detail.

Figure 3:
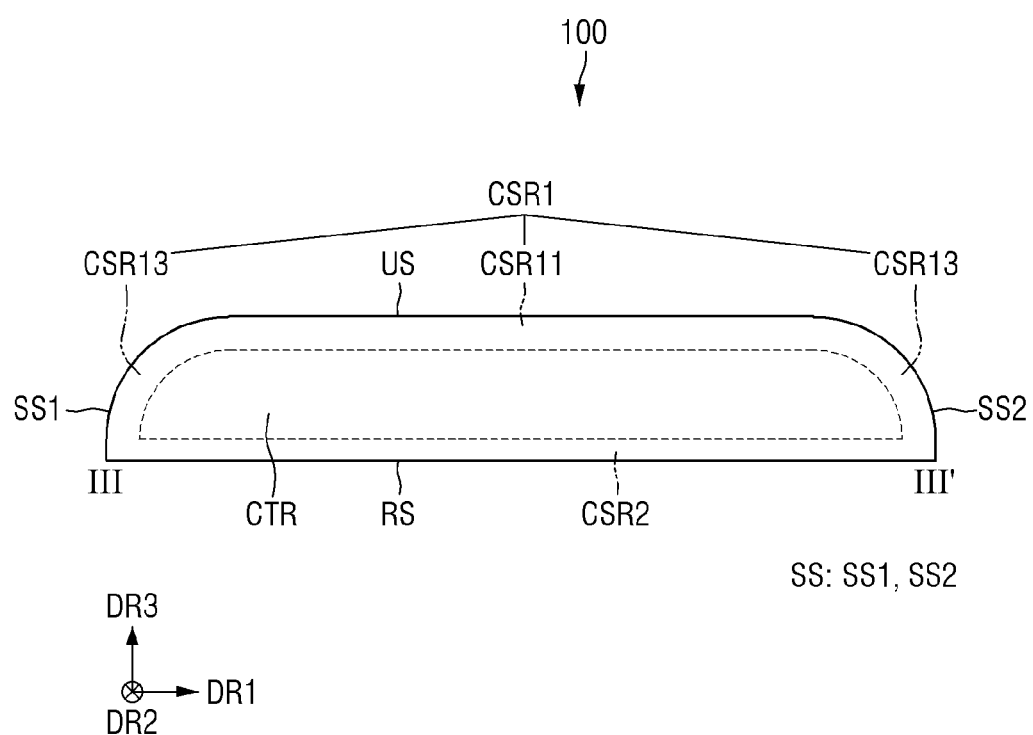
FIG. 3 is a cross-sectional view of a glass article according to the embodiment of FIG. 1, taken along line III-III'.

FIG. 3 is a cross-sectional view of a glass article according to the embodiment of FIG. 1, taken along line III-III'.

Referring to FIG. 3, the glass article 100 may include the first surface US having a flat surface, the second surface RS having a surface opposed to the first surface US in the third direction DR3 that is a thickness direction, a first side surface SS1 connecting the first surface US to the second surface RS at one side of the glass article 100 crossing the first direction DR1 in a side region, and a second side surface SS2 connecting the first surface US to the second surface RS at another side opposite to the first side surface SS1 in the first direction DR1 in a side region. In the glass article 100, the first surface US and the second surface RS are major surfaces having large areas.

A thickness t (See FIG. 4) of the glass article 100 is defined as a distance between the first surface US and the second surface RS in the third direction DR3. The thickness t of the glass article 100 may range, but is not limited to, from about 0.1 to 2 millimeters (mm). In the vicinity of the inclined side surfaces SS1 and SS2, the thickness t of the glass article 100 may be smaller than the thickness between the first surface US and the second surface RS.

When the glass article 100 serves to transmit light in the same manner as the cover window of a display, the light may be mainly incident on one of the first surface US and the second surface RS and pass through the other one of the first surface US and the second surface RS. In addition, light may enter either the first side surface SS1 or the second side surface SS2 to pass the second surface RS, or light may enter the second surface RS to pass either the first side surface SS1 or the second side surface SS2.

The glass article 100 may include a first compressive region CSR1, a second surface compressive region CSR2 extending from the second surface RS to a compression depth, and a tensile region CTR disposed at the interior of the glass article 100 while being surrounded by the first compressive region CSR1 and the second surface compressive region CSR2.

The first compressive region CSR1 may include a first surface compressive region CSR11 extending from the first surface US to a compression depth, a first side compressive region CSR12 extending from the first side surface SS1 to a compression depth, and a second side compressive region CSR13 extending from the second side surface SS2 to a compression depth.

The first side surface SS1 and the second side surface SS2 may substantially face upward in the same way as the first surface US. Similar ion exchange to the case of the first surface US during chemical strengthening may be performed in the first side surface SS1 and the second side surface SS2 because the first and second side surfaces SS1 and SS2 do not come into contact with molten tin in the fabrication process of the glass article 100 by the float process. Accordingly, since the first surface compressive region CSR11, the first side compressive region CSR12, and the second side compressive region CSR13 may exhibit similar compressive stress profiles, in the following embodiment, they will be described by being collectively referred to as the first compressive region CSR1. On the other hand, since the second surface RS is fabricated in contact with molten tin in the fabrication process of the glass article 100 by the float process, ion exchange in the second surface RS may be performed in a different aspect from the first surface US.

Hereinafter, the stress profile of the strengthened glass article 100 will be described in detail.

Figure 4:
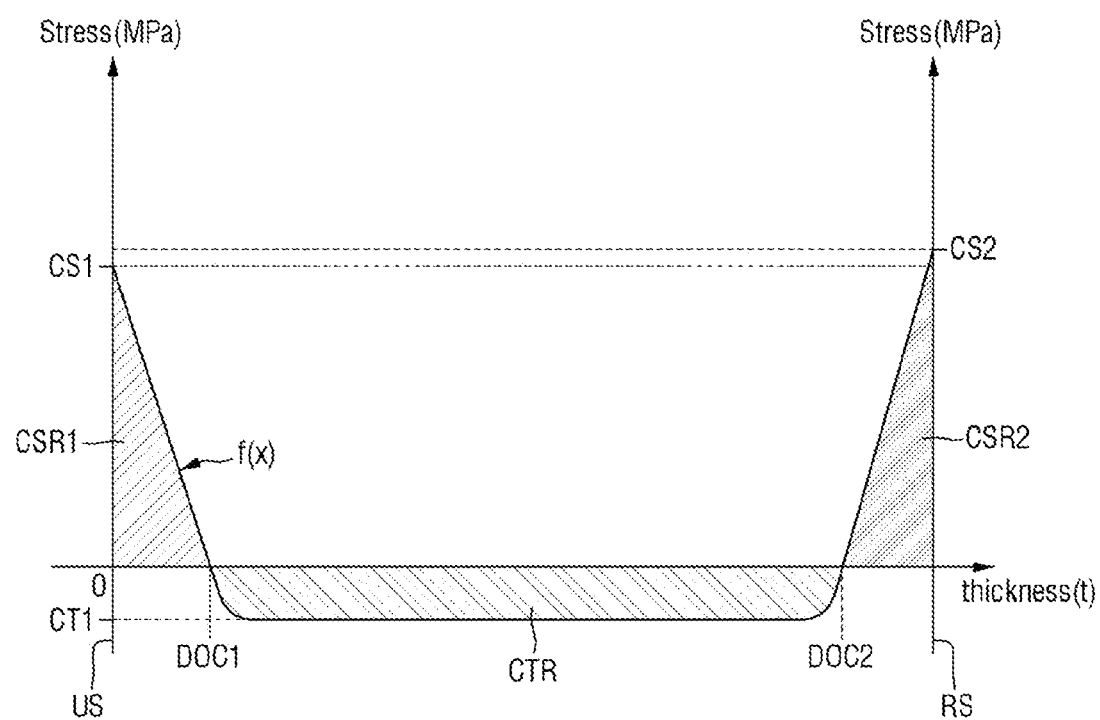
FIG. 4 is a graph showing a stress profile of a glass article according to an exemplary embodiment.

FIG. 4 is a graph showing a stress profile of a glass article according to an exemplary embodiment. In the graph of FIG. 4, an X-axis represents a location in the glass article 100 from the first surface US in the thickness direction. In FIG. 4, the compressive stress has positive values, while the tensile stress has negative values.

Herein, the magnitude of the compressive/tensile stress means the magnitude of an absolute value regardless of its sign.

Referring to FIGS. 3 and 4, the graph of FIG. 4 represents stress profiles (unit: megapascal (MPa)) of a region across the first surface US and the second surface RS in the thickness direction (i.e., the third direction DR3). As described above, in the first side surface SS1 and the second side surface SS2, similar ion exchange to that in the first surface US may be performed, and thus the stress profiles of the first and second side compressive regions CSR12 and CSR13 each may be similar to the stress profile of the first surface compressive region CSR11. Therefore, a description of the stress profile of the first surface compressive region CSR11 replaces a description of the stress profiles of the first and second side compressive regions CSR12 and CSR13.

The first compressive region CSR1 and the second surface compressive region CSR2 are resistant to an external impact to prevent the occurrence of cracks or breakage of the glass article 100. As the maximum compressive stress CS1 of the first compressive region CSR1 and the maximum compressive stress CS2 of the second surface compressive region CSR2 are larger, the strength of the glass article 100 generally increases. Since an external impact is usually transmitted through the surface of the glass article 100, it is advantageous to have the maximum compressive stresses CS1 and CS2 at the surface of the glass article 100 in terms of durability. From this perspective, the compressive stress of the first compressive region CSR1 and the second surface compressive region CSR2 tends to be the largest at the surface and generally decreases toward the inside. Referring to FIG. 4, since the maximum compressive stress CS1 of the first compressive region CSR1 corresponds to the compressive stress at the first surface US, the maximum compressive stress CS1 of the first compressive region CSR1 corresponds the maximum compressive stress of the first surface compressive region CSR11.

The first maximum compressive stress CS1 of the first compressive region CSR1 and the second maximum compressive stress CS2 of the second compressive region CSR2 each may be 700 MPa or more. For example, the first maximum compressive stress CS1 of the first compressive region CSR1 and the second maximum compressive stress CS2 of the second compressive region CSR2 each may be in the range of about 800 MPa to about 1,050 MPa. In one embodiment, the first maximum compressive stress CS1 of the first compressive region CSR1 and the second maximum compressive stress CS2 of the second compressive region CSR2 each may be in the range of about 850 MPa to about 1,000 MPa.

The stress energy accumulated in one region having a constant thickness t in the thickness direction in the glass article 100 may be calculated as an integrated value of the stress profile. The following relational expression may be established when the stress profile (y value in the graph of FIG. 4) in the glass article 100 having a thickness t is represented as a function f(x).

[Mathematical Expression 1]

$$\int_0^t f(x)dx =$$

That is, in the stress profiles illustrated in FIG. 4, the sum of the area of a region corresponding to the first compressive region CSR1 and the area of a region corresponding to the second surface compressive region CSR2 may be the same as the area of a region corresponding to the tensile region CTR.

Throughout the glass article 100, the tensile stress of the tensile region CTR may be balanced with the compressive stress of the compressive regions CSR1 and CSR2. That is, the total compressive stress (i.e., total compressive energy) in the glass article 100 may be the same as the total tensile stress (i.e., total tensile energy) in the glass article 100. Specifically, the sum of the total compressive stress (i.e., first compressive energy) of the first compressive region CSR1 and the total compressive stress (i.e., second compressive energy) of the second surface compressive region CSR2 may be the same as the total tensile stress (i.e., total tensile energy) of the tensile region CTR.

The greater the magnitude of the tensile stress in the glass article 100, the more likely the fragments are to be vigorously released when the glass article 100 is broken, and the more likely the glass article 100 is to be broken from the inside. In some embodiments, the maximum tensile stress CT1 may be 100 MPa or less, or 85 MPa or less. The maximum tensile stress CT1 of 75 MPa or more may be desirable to improve mechanical properties such as strength. In an exemplary embodiment, the maximum tensile stress CT1 may be greater than or equal to 75 MPa and less than or equal to 85 MPa, but the invention is not limited thereto.

The maximum tensile stress CT1 of the glass article 100 may be generally located at a central portion in the thickness direction of the glass article 100. For example, the maximum tensile stress CT1 of the glass article 100 may be located at a depth in the range of 0.4 t to 0.6 t, or in the range of 0.45 t to 0.55 t, or at a depth of about 0.5 t, when the thickness of the glass article 100 is t.

The first compression depth DOC1 and the second compression depth DOC2 suppress cracks or grooves formed in the first surface US and the second surface RS from propagating to the tensile region CTR inside the glass article 100. As the first compression depth DOC1 and the second compression depth DOC2 are larger, it is possible to more efficiently prevent propagation of cracks and the like. The points corresponding to the first compression depth DOC1 and the second compression depth DOC2 correspond to boundaries between the first compressive region CSR1 and the tension region CTR and between the second compressive region CSR2 and the tension region CTR, respectively, and have a stress value of zero.

The first compression depth DOC1 and the second compression depth DOC2 may each have values in a range of about 20 micrometers (μm) to about 150 μm. In an exemplary embodiment, the first and second compression depths DOC1 and DOC2 may each have values in a range of about 50 μm to about 100 μm. In a specific embodiment, the first and second compression depths DOC1 and DOC2 may each have values in a range of about 70 μm to about 85 μm.

The stress profiles as shown in FIG. 4 may be formed through chemical strengthening by an ion exchange process.

Figure 5:
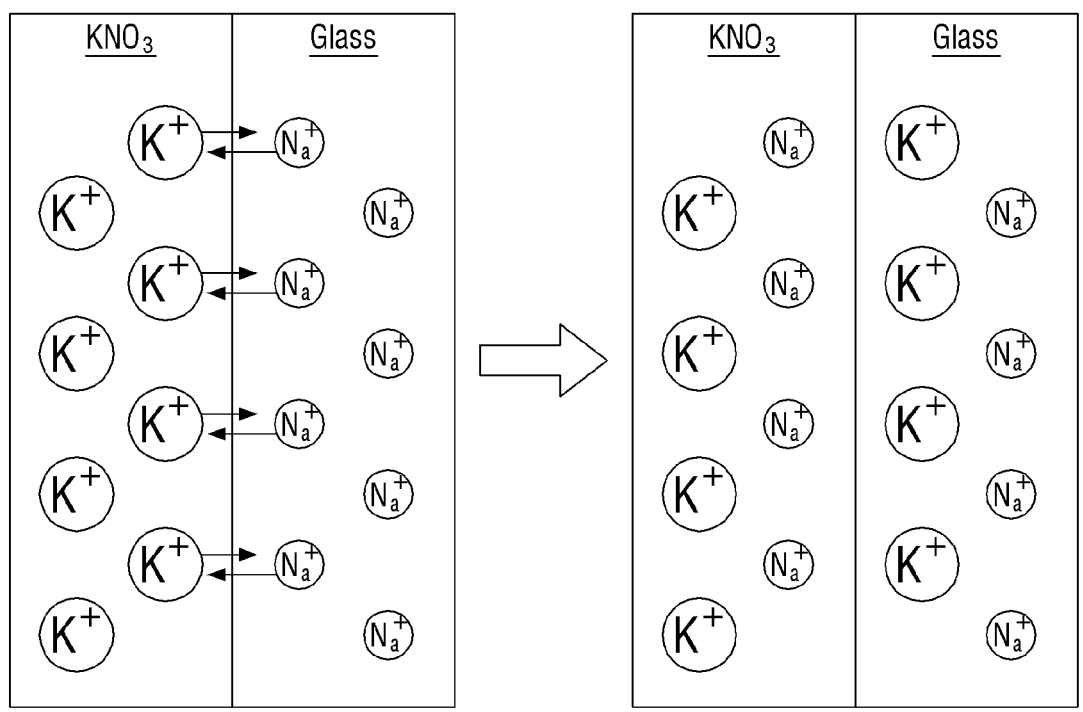
FIG. 5 is a schematic diagram showing an ion exchange process of a chemical strengthening step.

FIG. 5 is a schematic diagram showing an ion exchange process of a chemical strengthening step. Referring to FIG. 5, in the ion exchange process, when exposed to potassium (K) ions, for example, by immersing the glass which contains sodium (Na) ions in a molten salt bath which contains potassium nitrate ($KNO_3$), the sodium (Na) ions inside the glass are discharged to the outside and the potassium (K) ions outside the glass may replace the sodium (Na) ions. Since the exchanged potassium (K) ions have a larger ionic radius than the sodium (Na) ions, it generates compressive stress. The greater the amount of potassium (K) ions exchanged is, the greater the compressive stress is. Since the ion exchanges are performed through the surfaces US and RS of the glass, the amount of potassium (K) ions may be the greatest in the surfaces US and RS of the glass. Although some of the exchanged potassium (K) ions may diffuse into the glass to increase the depths, i.e., the compression depths DOC1 and DOC2, of the compressive regions CSR1 and CSR2, the amount of the exchanged potassium (K) ions may generally decrease as it goes away from the surfaces US and RS. Thus, the glass may have a stress profile that has the greatest compressive stresses CS1 and CS2 on the surfaces US and RS, respectively, and decreases toward the inside. However, the exemplary embodiments according to the invention are not limited to the above examples. The stress profile may be modified depending on the temperature, time, number of times, presence or absence of heat treatment and/or the like of the ion exchange process.

In the above-described ion exchange process, when the surfaces US and RS of the glass have different properties, the ion exchanges occurring in the respective surfaces may be performed in different aspects. For example, in the case of the float glass fabricated by the float process, since the amount of tin components differs according to the surface, the compressive stress profile may vary for each region when subjected to the ion exchange process.

The effect of tin ions on glass, which enter the glass during float glass fabrication by a float process, will be described. Due to a density difference, float glass may be molded on the top of molten tin on a bath. At this time, tin ions on the molten tin may partially enter the glass article 100 through the second surface RS to form a tin layer in the second surface compressive region CSR2. Here, the second surface RS on which the tin layer is formed may be referred to as a tin surface. On the other hand, the first surface US or the side surfaces SS on which the tin layer is not formed may be referred to as a non-tin surface.

Due to the great thermal expansion coefficient of tin, ion exchange with the outside may be actively performed in the second surface RS that is the tin surface at a temperature at which chemical strengthening occurs, compared to the first surface US and the side surfaces SS that are non-tin surfaces. Therefore, a larger amount of potassium (K) ions may be introduced to the second surface RS (i.e., the tin surface) than the first surface US and the side surfaces SS (i.e., the non-tin surfaces).

In addition, tin ions may block the diffusion of potassium (K) ions. Accordingly, a larger amount of potassium (K) ions may be distributed in a region of a narrower thickness at the second surface RS (i.e., the tin surface) than at the first surface US (i.e., the non-tin surface). That is, in the glass article 100, the density of potassium (K) ions in an area near the second surface RS, the second surface compressive region CSR2, may be greater than the density of potassium (K) ions in an area near the first surface US, the first compressive region CSR1.

For the above reason, the graph of the compressive stress profiles of the glass article 100 after the ion exchange process may have an asymmetric structure in the thickness direction (i.e., the third direction DR3). Specifically, the first maximum compressive stress CS1 may be smaller than the second maximum compressive stress CS2. The first compression depth DOC1 may be greater than the second compression depth DOC2.

Referring to FIG. 4 again, when a deviation occurs in the total compressive energies of the opposed surfaces (i.e., the first and second surfaces US and RS) of the glass article 100, a warpage phenomenon occurs, in which the glass article 100 warps in the direction of the surface having the smaller compressive energy. Therefore, it may be desirable to adjust the total compressive energies of the opposed surfaces to the same level. Here, the surface opposed to the second surface RS may include the inclined side surfaces SS that face substantially upward as well as the first surface US. Accordingly, it is preferable to control the total compressive energy of the second surface compressive region CSR2 at the same level as the total compressive energy of the first surface compressive region CSR11, the first side compressive region CSR12, and the second side compressive region CSR13.

As described above, since the ion exchange process is affected by the presence of the tin layer or the density of tin, when the total compressive energy of the first surface compressive region CSR11, the first side compressive region CSR12, and the second side compressive region CSR13 is greater than the total compressive energy of the second surface compressive region CSR2, where the total compressive energies are measured after the ion exchange process, it may be desirable to adjust the compressive energy. For example, the compressive energy of the first compressive region CSR1 may be decreased by polishing the first surface US through an after-treatment process to partially remove the corresponding region. In this way, it is possible to adjust the total compressive energies of both opposed side surfaces to be equal. Since the stress profiles of FIG. 4 show stress profiles of one cross section of the glass article 100, the area of the region corresponding to the first compressive region CSR1 and the area of the region corresponding to the second surface compressive region CSR2 may be different from each other. Even in this case, the total compressive stress (i.e., total compressive energy) of the first compressive region CSR1 and the total compressive stress (i.e., total compressive energy) of the second surface compressive region CSR2 of the entire glass article 100 may be the same.

When the polishing process is performed on the first surface US as the after-treatment process after strengthening, the first surface US may have the maximum compressive stress smaller than that of the side surfaces SS. However, when the first surface US and the side surfaces SS are polished together in the after-treatment process after strengthening, the maximum compressive stresses of the first surface US and the side surfaces SS may be equal.

The first maximum compressive stress CS1 of the first surface US is not only set to be smaller than the second maximum compressive stress CS2 of the second surface RS as a result of the ion exchange process, but also further decrease when the polishing process is additionally performed. Therefore, the first maximum compressive stress CS1 may be smaller than the second maximum compressive stress CS2. For example, the difference between the second maximum compressive stress CS2 and the first maximum compressive stress CS1 may be in a range of about 5 MPa to about 15 MPa. In the above range, it is possible to effectively reduce the occurrence of warpage of the float glass. By adjusting the difference between the first maximum compressive stress CS1 and the second maximum compressive stress CS2 within the above range, it is possible to prevent the occurrence of warpage of the glass article 100.

The first compression depth DOC1 after the ion exchange process is greater than the second compression depth DOC2, but the first compression depth DOC1 may be slightly changed when the first surface US is polished in the after-treatment process. However, even in this case, the first compression depth DOC1 may maintain a value greater than the second compression depth DOC2. The difference between the first compression depth DOC1 and the second compression depth DOC2 may be in a range of about 0.01 μm to about 1.0 μm, but the present disclosure is not limited thereto.

In the above-described glass article 100 according to an exemplary embodiment, it is possible to distinguish between the upper and lower surfaces of the glass by protectively coating the tin surface in which relatively active ion exchanges are performed and ion diffusion is blocked. Therefore, even if there is an area difference between the upper and lower surfaces US and RS of the glass article 100 by performing computer numerical control ("CNC") machining on the non-tin surface as a front surface, it is possible to reduce warpage due to the stress imbalance in both surfaces US and RS of the glass article 100 in the chemical strengthening.

Figure 6:
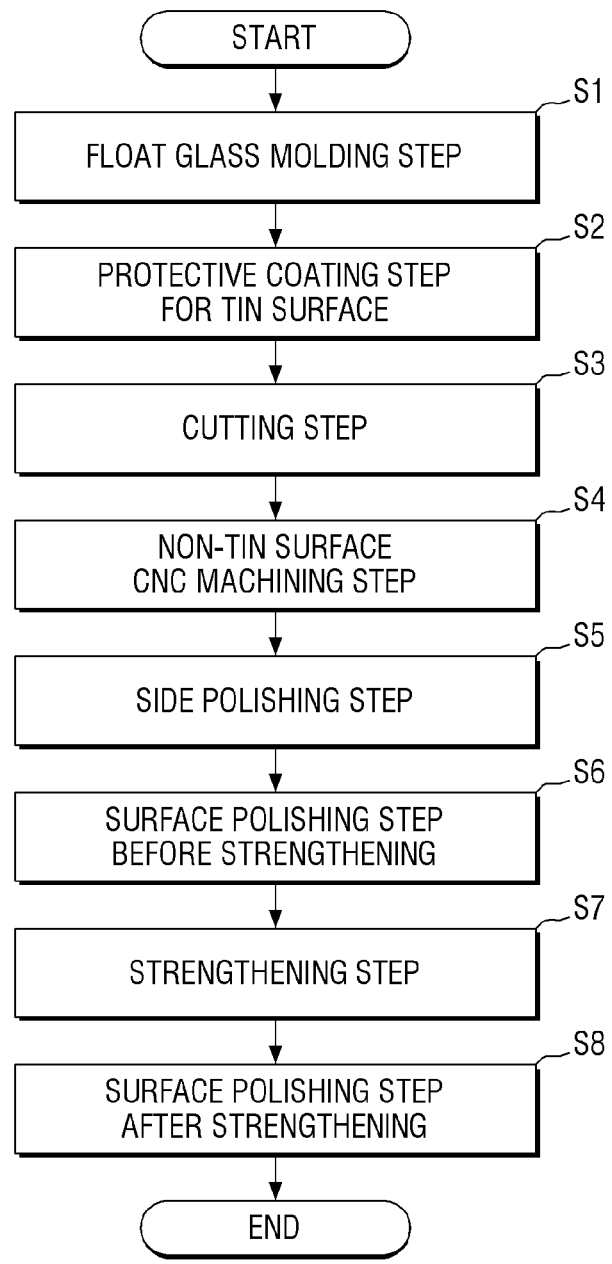
FIG. 6 is a flowchart showing the steps of a method for fabricating a glass article according to an exemplary embodiment.
Figure 7:
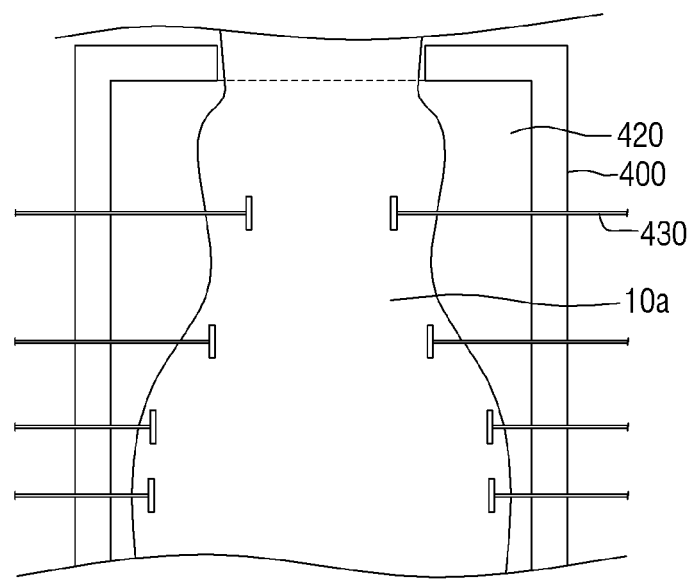
FIG. 7 is a schematic view showing float glass during a molding process.
Figure 8:
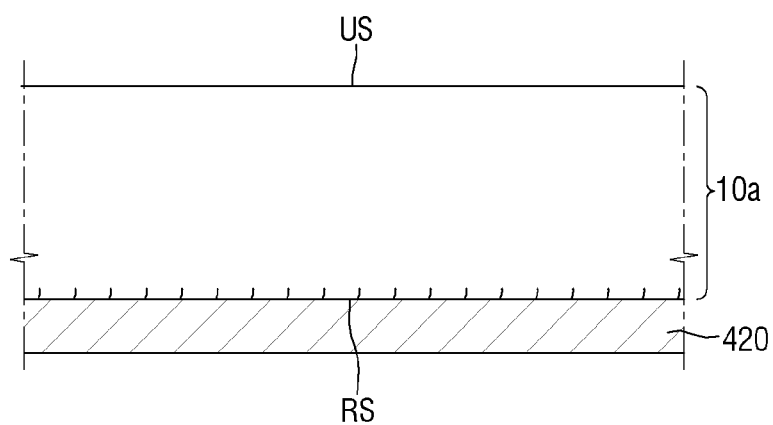
FIG. 8 is a cross-sectional view of the float glass during the molding process.
Figure 9:
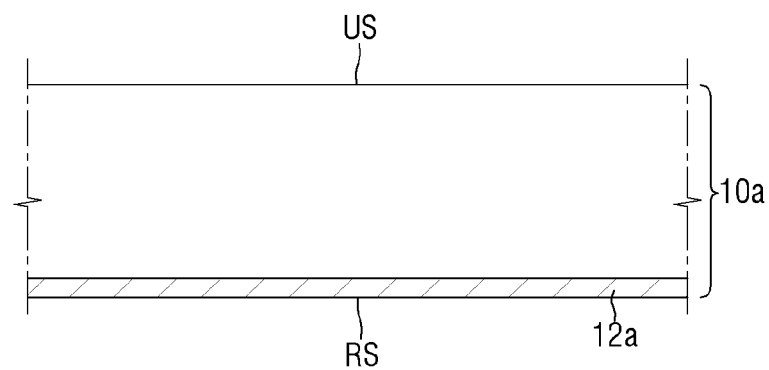
FIG. 9 is a cross-sectional view of the float glass after the molding process.
Figure 10:
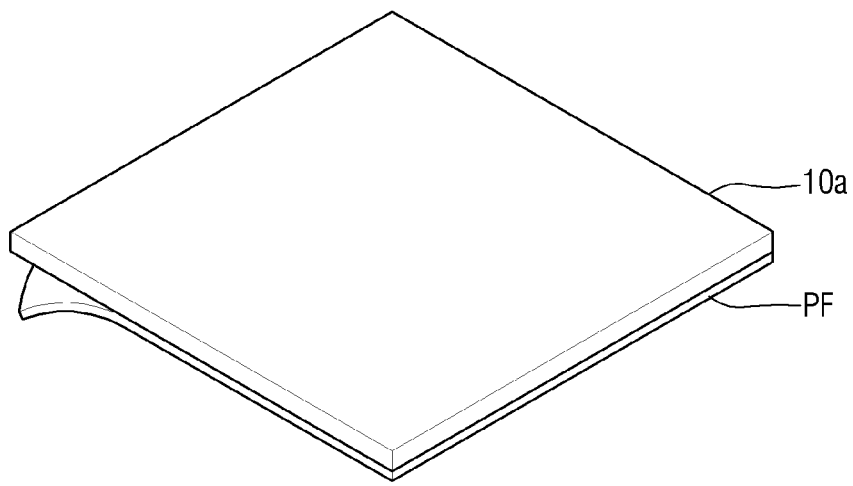
FIG. 10 is a schematic view showing a process of attaching a protective film to the float glass.
Figure 11:
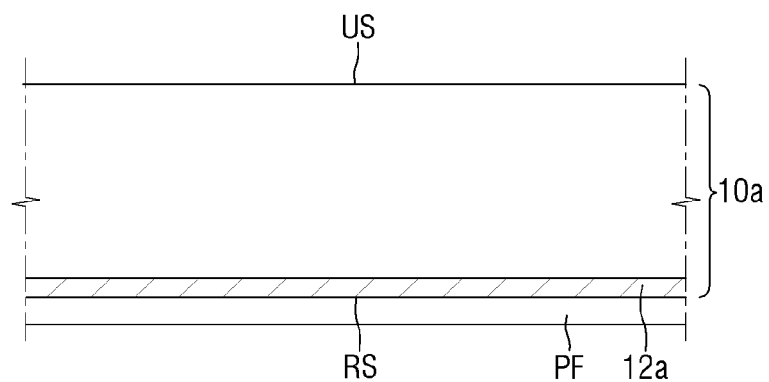
FIG. 11 is a cross-sectional view of the float glass protectively coated with tin.
Figure 12:
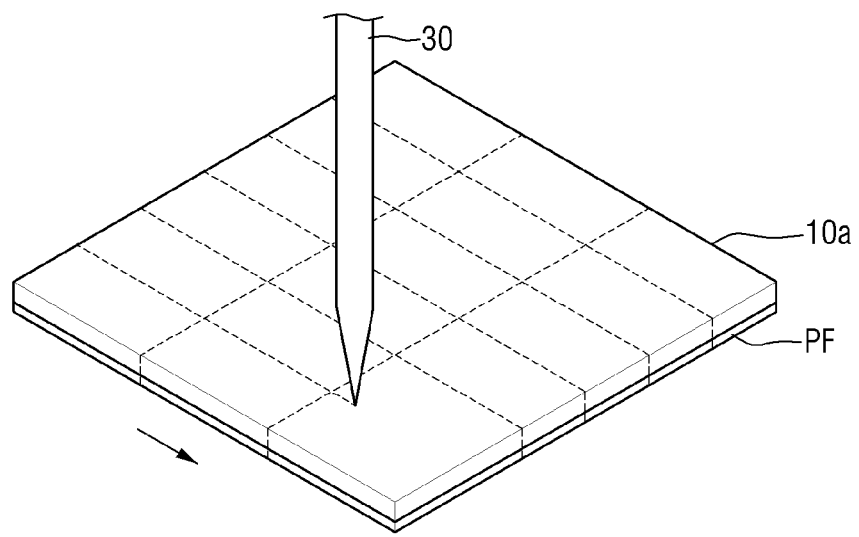
FIG. 12 is a schematic view showing a cutting step.
Figure 13:
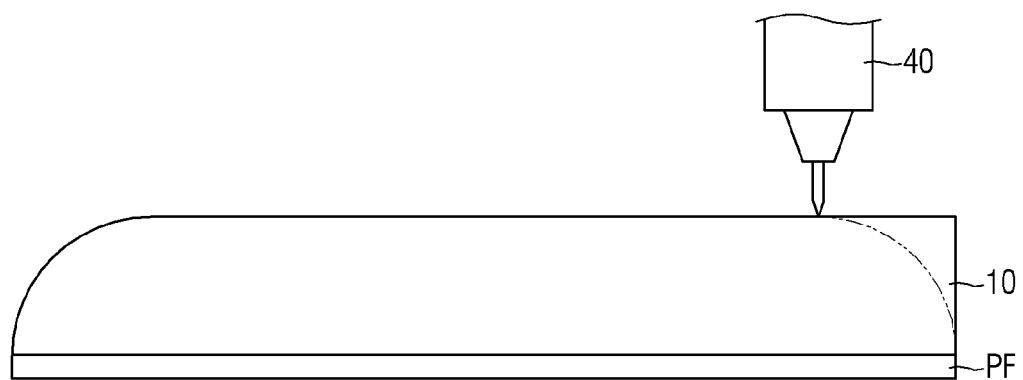
FIG. 13 is a schematic view illustrating a CNC machining step.
Figure 14:
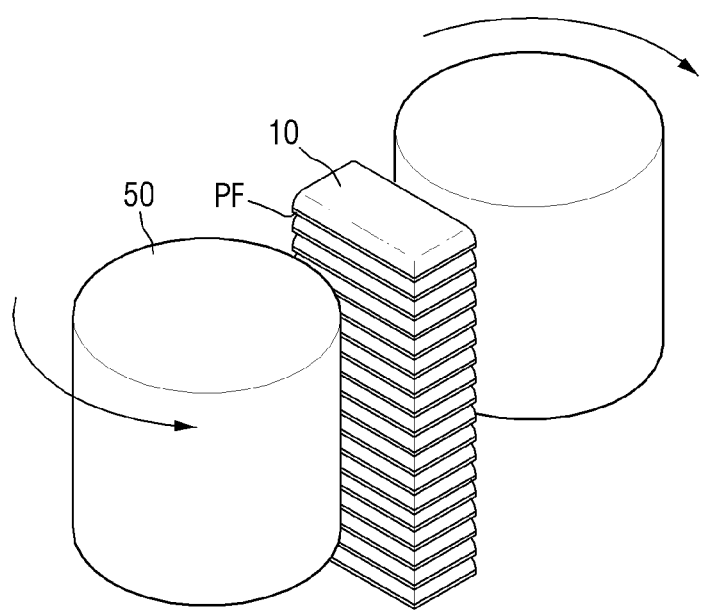
FIG. 14 is a schematic view illustrating a side polishing step.
Figure 15:
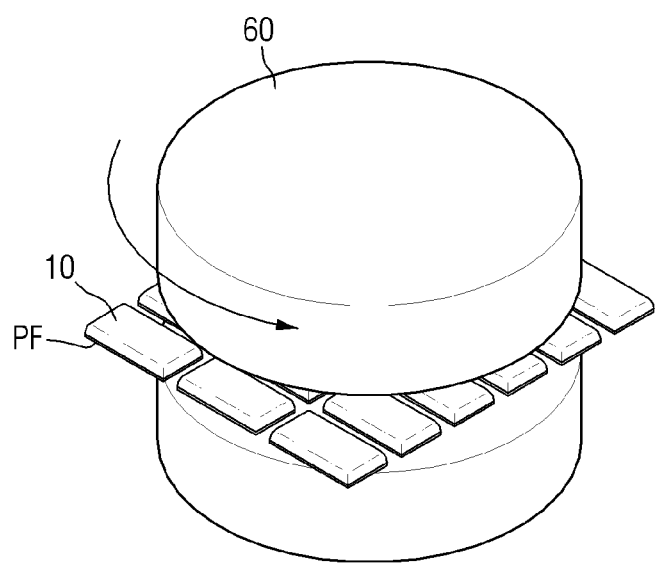
FIG. 15 is a schematic view illustrating a surface polishing step before strengthening.
Figure 16:
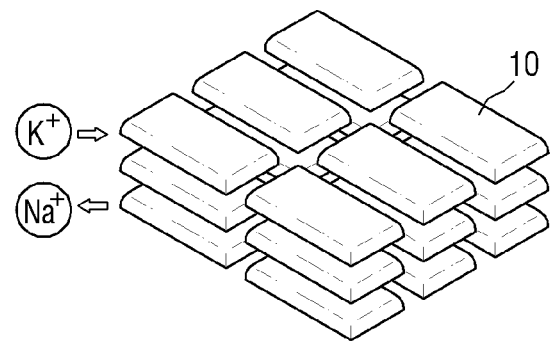
FIG. 16 is a schematic view illustrating a chemical strengthening step.
Figure 17:
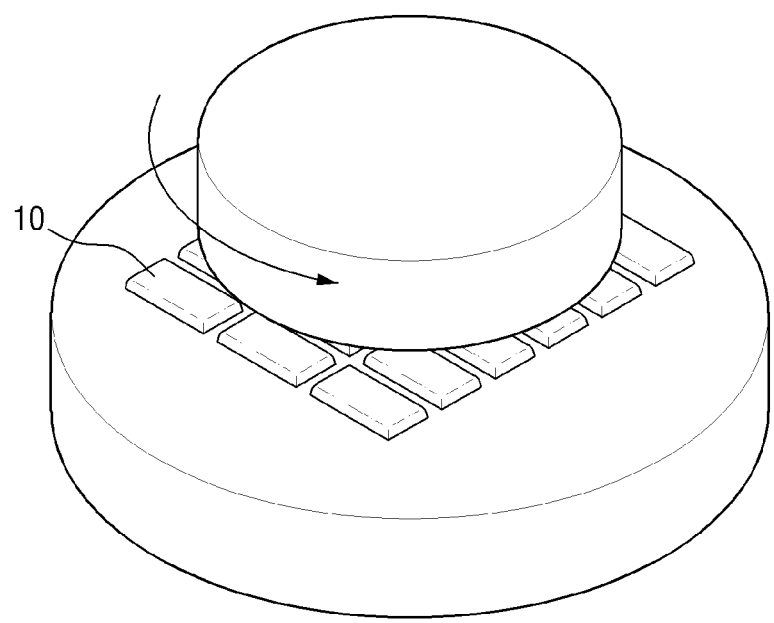
FIG. 17 is a schematic view illustrating a surface polishing step after strengthening.

FIG. 6 is a flowchart showing the steps of a method for fabricating a glass article according to an exemplary embodiment. FIG. 7 is a schematic view showing float glass during a molding process. FIG. 8 is a cross-sectional view of the float glass during the molding process. FIG. 9 is a cross-sectional view of the float glass after the molding process. FIG. 10 is a schematic view showing a process of attaching a protective film to the float glass. FIG. 11 is a cross-sectional view of the float glass protectively coated with tin. FIG. 12 is a schematic view showing a cutting step. FIG. 13 is a schematic view illustrating a CNC machining step. FIG. 14 is a schematic view illustrating a side polishing step. FIG. 15 is a schematic view illustrating a surface polishing step before strengthening. FIG. 16 is a schematic view illustrating a chemical strengthening step. FIG. 17 is a schematic view illustrating a surface polishing step after strengthening.

Hereinafter, a method for fabricating the glass article 100 according to an exemplary embodiment will be described with reference to FIGS. 6 to 17.

Referring to FIG. 6, the method for fabricating the glass article 100 according to an exemplary embodiment may include a float glass molding step S1, a protective coating step S2 for a tin surface, a cutting step S3, a non-tin surface CNC machining step S4, a side polishing step S5, a surface polishing step S6 before strengthening, a strengthening step S7 and a surface polishing step S8 after strengthening.

Referring to FIGS. 6 and 7, the molding step S1 may include preparing a glass composition and molding the glass composition.

The glass composition has silicon dioxide ($SiO_2$) as a main component. In addition, it may contain components such as aluminum oxide ($Al_2O_3$), lithium oxide ($LiO_2$) and sodium oxide ($Na_2O$), but is not limited thereto, and may further include other components. In one embodiment, the glass composition may include glass ceramics containing alkali aluminosilicate.

The glass composition may be molded into a plate glass shape by a float process.

Specifically, the glass composition may be heated and melted by a heating source (not shown) in a melting chamber. The heating source (not shown) may perform the melting by heating the glass composition at a temperature higher than the melting point of the glass composition. The process of fabricating the glass composition in the melting chamber is well known in the art, and thus a detailed description thereof is omitted.

The glass composition may be molded in a bath 400, thereby being fabricated as molten glass 10a. The glass composition is introduced into the bath 400 from the melting chamber in an amorphous state. Molten tin 420 may be accommodated in the bath 400. More specifically, the tin 420 melted at a temperature in a range of about 700 degrees Celsius (° C.) to about 1200° C. may be accommodated in the bath 400. The introduced glass composition (molten glass) 10a in a molten state may be disposed above the molten tin 420 due to the density difference with the molten tin 420. That is, the density of the molten glass 10a is smaller than the density of the molten tin 420, and the molten glass 10a may be cast in a floating state above the molten tin 420. The molten glass 10a introduced into the bath 400 in a fluid state may be pulled laterally above the horizontal surface of the bath 400 by a plurality of forming bars 430 to be molded into a desired shape.

Referring to FIGS. 6, 8, and 9, since the molten tin 420 is present below the molten glass 10a during the molding process, tin ions may partially enter the molten glass 10a in contact with the molten tin 420, as described above. Accordingly, one surface of the molten glass 10a in contact with the molten tin 420 in the bath 400 may become the second surface RS in which a tin layer 12a is formed. Tin ions of the tin layer 12a may cause a difference in the rate of ion diffusion and ion exchange in the subsequent chemical strengthening step, thereby generating a difference in the compressive stresses of the glass fabricated through the chemical strengthening as described above, and thus resulting in warpage.

Referring to FIGS. 6, 10 and 11, the tin surface of the glass 10a may be protectively coated (step S2). Here, the tin surface of the glass 10a may be the second surface RS in contact with the molten tin 420 in the fabricating process. The protective coating step S2 for the tin surface of the glass 10a may be performed before the glass strengthening step S7. In an exemplary embodiment, the protective coating step S2 for the tin surface may be performed by attaching a protective film PF to the second surface RS (See FIG. 11), but the present disclosure is not limited thereto. The protective film PF may be attached to the second surface RS which is the tin surface of the glass 10a by a pressing roller (not shown), but the present disclosure is not limited thereto. The protective film PF may also be attached manually or attached by an attachment robot. Referring to FIG. 11, the attached protective film PF may contact the second surface RS which is the tin surface of the glass 10a, and one surface of the attached protective film PF may be parallel with one surface of the first surface US and/or the second surface RS of the glass 10a.

The second surface RS attached with the protective film PF may be protected from polishing or chemical strengthening by the protective film PF. Specifically, the second surface RS attached with the protective film PF may not be polished or chemically strengthened even when a polishing process, a chemical strengthening process or the like is applied.

In an exemplary embodiment, the protective film PF may be used to distinguish between a surface to which a three-dimensional machining process will be applied and a surface to which the three-dimensional machining process will not be applied, in the three-dimensional machining step which will be described later. Specifically, the protective film PF may not be attached to the surface to which the three-dimensional machining process will be applied, and may be attached to the surface (i.e., the second surface RS) to which the three-dimensional machining process will not be applied. By distinguishing between both surfaces, in the three-dimensional machining step, the surface to which the protective film PF has been attached is not machined and the surface to which the protective film PF has not been attached is machined. Therefore, the protective film PF may be made of an opaque material. However, the type of the material of the protective film PF is not limited thereto, and even a transparent material may be used as far as the surface attached with the protective film PF and the surface not attached with the protective film PF can be distinguished. Since the protective film PF may be removed in a later process, it is preferable that the protective film PF is made of a material which is easily attachable and detachable to/from the glass 10a.

The protective film PF may be made of at least one of polyethylene terephthalate ("PET"), thermoplastic polyurethane ("TPU"), polyvinyl chloride ("PVC"), polypropylene ("PP") or polyimide ("PI"), or a mixture thereof, but the material of the protective film PF according to the invention is not limited thereto. It may be preferable that at least one surface (i.e., the surface attached to the glass 10a) of the protective film PF has an adhesive property.

Referring to FIGS. 6 and 12, the glass 10a may be cut through the cutting step S3. The glass 10a may have a size different from that applied to a final glass article 100. For example, molding of the glass 10a may be performed to form a large-area substrate including a plurality of glass articles. The glass 10a may be cut into a plurality of cells (i.e., glasses 10) to produce a plurality of glass articles. For example, when the final glass article 100 has a size of about 6 inches, by molding the glass 10a to have a size (e.g., 120 inches) of several to several hundred times the size of the final glass article 100 and then cutting the glass 10a, 20 glass articles 100 can be obtained at once. In this way, process efficiency can be improved as compared with a case of molding an individual glass article separately. Cutting of the glass 10a may be performed using a cutting knife 30, a cutting wheel, a laser, or the like.

Referring to FIGS. 6 and 13, the non-tin surface of the glass 10 may be subjected to computer numeric control (CNC) machining (step S4). As described above, in the fabricating process, the non-tin surface may be the first surface US which is not in contact with the molten tin 420, and to which the protective film PF is not attached. The CNC machining with respect to the non-tin surface may be three-dimensional machining performed by using CNC machining equipment 40. The CNC machining may not be applied to the second surface RS of the glass 10, to which the protective film PF has been attached. In an exemplary embodiment, although the first surface US is CNC-machined to form the side surfaces SS having rounded edge portions, the present disclosure is not limited thereto, and the first surface US may be three-dimensionally machined into various shapes.

The non-tin surfaces US and SS and the tin surface RS of the glass 10 that has undergone the CNC machining step S4 may have different surface areas. Specifically, since the side surfaces SS are formed by applying the CNC machining step (S4) to the first surface US, the surface area of the non-tin surfaces US and SS may be increased. Therefore, the non-tin surfaces US and SS may have the total surface area greater than the surface area of the second surface RS that is the tin surface to which CNC machining has not been applied.

Referring to FIGS. 6, 14 and 15, the polishing steps before strengthening may be performed between the CNC machining step S4 and the strengthening step S7. The polishing steps may include the side polishing step S5 and the surface polishing step S6 before strengthening. In an exemplary embodiment, after the side polishing step S5 is performed first, the surface polishing step S6 before strengthening may be performed, but this order may be reversed.

The side polishing step S5 is a step of polishing the side surface SS of the CNC-machined glass 10. In the side polishing step S5, the side surface SS of the glass 10 is polished to have a smooth surface. Further, each side surface SS of the glass 10 may have a uniform surface through the side polishing step S5. Further, if there is a small crack on the side surface, it can be removed through the side polishing step S5.

The side polishing step S5 may be performed simultaneously on a plurality of glasses 10. That is, in a state where the plurality of glasses 10 is stacked, the stacked glasses 10 may be polished at the same time.

The side polishing step S5 may be performed by a mechanical polishing method or a chemical mechanical polishing method using a polishing apparatus 50. In an exemplary embodiment, two opposite side surfaces SS of the glasses 10 may be polished simultaneously, and then the other two opposite side surfaces SS may be polished simultaneously, but the present disclosure is not limited thereto.

The surface polishing step S6 before strengthening may be performed such that each glass 10 has a uniform surface. The surface polishing step S6 before strengthening may be performed separately for each glass 10. However, when a chemical mechanical polishing apparatus 60 is sufficiently large compared to the glass 10, the plurality of glasses 10 may be horizontally arranged and then surface-polished simultaneously.

The surface polishing step S6 before strengthening may be performed by chemical mechanical polishing. Specifically, the first surface US and the second surface RS of the glass 10 are polished using the chemical mechanical polishing apparatus 60 and a polishing slurry. The first surface US and the second surface RS may be polished simultaneously. Alternatively, one surface of the first and second surfaces may be polished first, and then the other surface may be polished.

Referring to FIGS. 6 and 16, after the polishing steps S5 and S6 before strengthening, the strengthening step S7 is performed. As described above, when the protective film PF is coated, the corresponding surface may not be strengthened, and thus the protective film PF may be removed between the polishing step S6 before strengthening and the strengthening step S7. In another embodiment, the method may further include, between the protective film PF removing step and the glass strengthening step S7, a step of three-dimensionally machining the tin surface RS from which the protective film PF has been removed. Here, the area of the three-dimensionally machined tin surface RS may be smaller than the area of the three-dimensionally machined non-tin surfaces US and SS, but the present disclosure is not limited thereto. The step of three-dimensionally machining the tin surface RS may be performed in the same manner as the above-described three-dimensional machining performed on the non-tin surface US, but the present disclosure is not limited thereto. In another embodiment, the tin surface RS may be machined in other manners.

The strengthening step S7 may include chemical strengthening and/or thermal strengthening. In the case of the glass 10 having a thin thickness of 2 mm or less, particularly, about 0.75 mm or less, a chemical strengthening method may be appropriately applied for precise stress profile control. In the following embodiment, a case where a chemical strengthening method is applied to the strengthening step S7 of the glass 10 will be describe as an example.

Chemical strengthening may be performed through an ion exchange process. The ion exchange process is a process of exchanging ions in the glass 10 with other ions. The ion exchange process may be performed two or more times. For example, the ion exchange process may include a primary ion exchange process and a secondary ion exchange process. The primary ion exchange process and the secondary ion exchange process may be performed in different baths. Each ion exchange process may be performed simultaneously on the plurality of glasses 10. That is, by immersing the plurality of glasses 10 in one bath, the ion exchange process may be performed simultaneously on the plurality of glasses 10.

By performing the ion exchange process, the ions at or near the surface of the glass 10 can be replaced or exchanged with larger ions having the same valence or oxidation state. For example, when the glass 10 contains monovalent alkali metal ions such as lithium (Li) ions, sodium (Na) ions, potassium (K) ions and rubidium (Rb) ions, the monovalent cations on the surface may be replaced by sodium (Na) ions, potassium (K) ions, rubidium (Rb) ions, or cesium (Cs) ions with a larger ionic radius. For example, sodium (Na) ions in the glass 100 may be replaced by potassium (K) ions, rubidium (Rb) ions, or cesium (Cs) ions which have a larger ionic radius than sodium (Na) ions.

The chemical strengthening step may be single-salt or mixed-salt wet chemical strengthening by an immersion method. Specifically, the chemical strengthening step is performed by immersing the glass 10 in a molten salt containing salt of alkali metal ions and accommodated in a chemically strengthening bath. The alkali metal ions may include at least one of sodium (Na) ions, potassium (K) ions, rubidium (Rb) ions, or cesium (Cs) ions. That is, the chemical strengthening step (S7) may be performed by a molten salt of sodium (Na) ions, potassium (K) ions, rubidium (Rb) ions, or cesium (Cs) ions. The wet chemical strengthening may be advantageous in terms of mass production, and may realize a further uniform strengthening property. In some embodiments, dry chemical strengthening may also be performed.

In an exemplary embodiment, the chemical strengthening step may be performed by using a molten salt such as potassium nitrate ($KNO_3$) or sodium nitrate ($NaNO_3$) in a time range of about 1 hour to about 30 hours at a molten salt temperature of about 300° C. to about 500° C. In the chemical strengthening step, it is possible to exchange alkali ions in the surface layer of the glass 10 with ions having a relatively great ionic radius.

By performing the ion exchange process, the ions at or near the surface US or RS of the glass can be replaced or exchanged with larger ions having the same valence or oxidation state. For example, when the glass contains monovalent alkali metal ions such as lithium (Li) ions, sodium (Na) ions, potassium (K) ions and rubidium (Rb) ions, the monovalent cations on the surface may be replaced by sodium (Na) ions, potassium (K) ions, rubidium (Rb) ions, or cesium (Cs) ions with a larger ionic radius. The ion exchange process will be described in detail with reference to FIG. 5.

Referring back to FIG. 5, when exposed to potassium (K) ions, for example, by immersing the glass that contains sodium (Na) ions in a molten salt bath that contains potassium nitrate ($KNO_3$), the sodium (Na) ions inside the glass are discharged to the outside and potassium (K) ions may replace the sodium (Na) ions. Since the exchanged potassium (K) ions have a larger ionic radius than the sodium (Na) ions, it generates compressive stress. The greater the amount of potassium (K) ions exchanged is, the greater the compressive stress is. Since the ion exchange takes place through the surface of the glass, the amount of potassium (K) ions on the glass surface is the greatest. Although some of the exchanged potassium (K) ions may diffuse into the glass to increase the depths, i.e., the compression depths DOC1 and DOC2, of the compressive regions, the amount may generally decrease in a direction away from the surface. Thus, the glass may have a stress profile that has the greatest compressive stresses CS1 and CS2 on the surface and decreases toward the inside. However, the exemplary embodiments according to the invention are not limited to the above examples. The stress profile may be modified depending on the temperature, time, number of times, presence or absence of heat treatment and/or the like of the ion exchange process.

When the areas of both surfaces of the glass article 100 are different, the amount of ions exchanged through the surface having the larger area may be relatively great. When the area of the first surface US is larger than the area of the second surface RS, the amount of ions exchanged in the first surface US may be greater than that of ions exchanged in the second surface RS during chemical strengthening. Here, the fact that the larger the surface area is, the greater the amount of ions exchanged is may mean that the amount of ions exchanged per unit area is the same, but a larger amount of ions is exchanged due to the large area.

Potassium (K) ions may be densely distributed near the second surface RS of the glass 10. That is, in the second surface compressive region CSR2, a larger amount of potassium (K) ions may be distributed in a narrower thickness region, compared to the first surface compressive region CSR11. That is, the density of potassium (K) ions may be greater near the second surface RS than near the first surface US. Therefore, the compressive energy per unit volume of the second surface compressive region CSR2 is greater than compressive energy per unit volume of the first surface compressive region CSR11.

When a difference in compressive stresses occurs between both side surfaces of the glass which are opposed to each other, a phenomenon, in which the edge portions of the glass warp in the direction of the surface having a greater compressive stress, may occur. When chemically strengthening the glass 10 according to the method for fabricating the glass article in accordance with an exemplary embodiment, the first surface US of the glass 10 may have a factor increasing the compressive stress because the first surface US has a large region for potassium (K) ion exchange due to an increase in the area thereof through CNC machining. The second surface RS of the glass 10 may have a factor increasing the compressive stress because potassium (K) ions are distributed at a high density due to the tin layer 12a, as described above.

Therefore, when chemically strengthening the glass 10 according to the method for fabricating the glass article in accordance with an exemplary embodiment, there may be the factors which increase the compressive stresses of both the first surface US and the second surface RS. Accordingly, the difference in the compressive stresses of the first surface US and the second surface RS can be decreased, and therefore, the warpage of the glass article 100 may be effectively reduced.

Although not shown, as a comparative example, if the chemical strengthening is performed after three-dimensionally machining the second surface RS with the tin layer 12a formed thereon, both the large area and the tin layer 12a, which are the factors to increase compressive stress, may become present on the second surface RS. Therefore, the difference in compressive stresses between the first surface US and the second surface RS may increase even more in the chemical strengthening. Accordingly, the warpage of the glass article 100 may increase.

In some embodiments, the chemical strengthening step may include a preheating step, a main chemical strengthening step, and a slow cooling step. Through the preheating step, the strengthening uniformity can be improved, and thus damage to the glass 10 due to the thermal impacts can be prevented. In addition, through the slow cooling step, compressive stress can be applied to the surface of the glass 10, and thus damage to the glass 10 due to the thermal impacts can be effectively prevented.

After the chemical strengthening step, a cleaning step of removing foreign substances remaining on the surface of the glass 10 may be additionally performed. In the cleaning step, residues such as a molten salt present on the surface of the glass article 100 may be removed. The cleaning step may be performed by using a cleaning solution such as water, or by using an immersion method while ultrasonic waves are applied.

Referring to FIGS. 6 and 17, after chemically strengthening the glass 10, the surface polishing step S8 after strengthening may be performed. In the surface polishing step S8 after chemical strengthening, the first surface US is polished, unlike the polishing steps S5 and S6 before chemical strengthening in which all surfaces of the glass 10 are polished. When a glass surface having compressive stress is polished, the glass surface may be partially removed, and thus the compressive stress of the surface may be decreased.

After the chemical strengthening process, a deviation between the total compressive stresses (i.e., total compressive energies) of the first compressive region CSR1 and the second surface compressive region CSR2 may occur. By removing the surface of the compressive region having a greater total compressive stress (i.e., total compressive energy) to an appropriate thickness through the polishing process, it is possible to decrease the deviation between the total compressive stresses (i.e., total compressive energies) of the respective compressive regions.

In one cross section of the glass 10, the total compressive stress (i.e., total compressive energy) of the second surface compressive region CSR2 including the second surface RS that is the tin surface containing a high density of the potassium (K) ions, may be relatively great. However, in terms of the entire region, the first compressive region CSR1 including the first surface US and the side surfaces SS, which are non-tin surfaces including the large area of the compressive region, may have a greater total compressive stress (i.e., total compressive energy).

Accordingly, the total compressive stress (i.e., total compressive energy) of the first compressive region CSR1 may be decreased by polishing the first surface US after chemical strengthening. Asymmetry of the total compressive stresses (i.e., total compressive energies) of the first compressive region CSR1 and the second surface compressive region CSR2 may be alleviated by decreasing the total compressive stress (i.e., total compressive energy) of the first compressive region CSR1.

As described above, when the polishing process of the first surface US is performed as the polishing process after chemical strengthening, the first surface US may have the maximum compressive stress smaller than that of the side surfaces SS. However, when the first surface US and the side surfaces SS are polished simultaneously through the polishing process after chemical strengthening, the maximum compressive stress of the first surface US and the maximum compressive stress of the side surfaces SS may have equal values.

The first maximum compressive stress CS1 of the first surface US may be not only set smaller than the second maximum compressive stress CS2 of the second surface RS as a result of the ion exchange process, but also further decreased when the polishing process is additionally performed. Therefore, the first maximum compressive stress CS1 becomes smaller than the second maximum compressive stress CS2.

In the case of the polishing process, it is possible to determine whether to polish each surface, and to differently adjust the polishing thickness for each surface, so that the compressive stress of each of the compressive regions CSR1 and CSR2 can be separately controlled. For example, a surface having a relatively great total compressive stress (i.e., total compressive energy) is more polished, thereby controlling the deviation between the total compressive stresses (i.e., total compressive energies). Consequently, through the surface polishing step S8 after chemical strengthening, the stress asymmetry of the first compressive region CSR1 and the second surface compressive region CSR2 can be alleviated, and therefore, the warpage of the glass article 100 may further be reduced.

Figure 18:
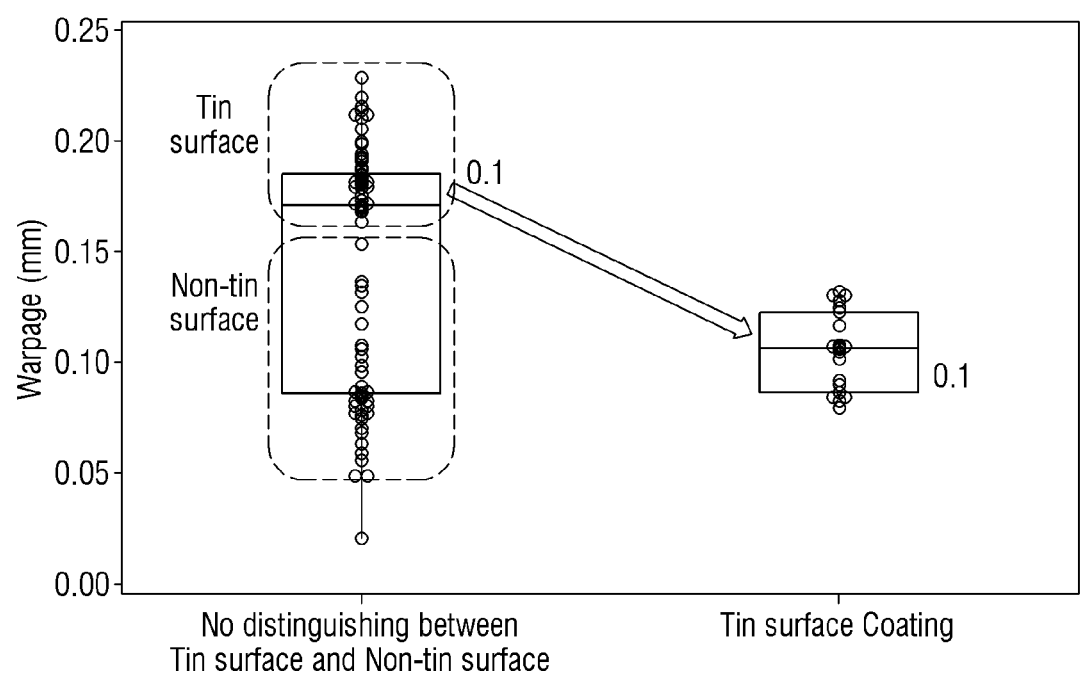
FIG. 18 illustrates graphs for comparing the warpages of glass articles according to whether a protective coating is applied in the fabricating process of each glass article.

FIG. 18 illustrates graphs for comparing the warpages of glass articles according to whether a protective coating is applied in the fabricating process of each glass article.

Referring to FIG. 18, the left graph represents the warpage occurred when chemical strengthening is performed after CNC-machining one of the first surface US and the second surface RS without distinguishing between the first surface US and the second surface RS.

The numerical value of the warpage may be obtained by the difference between the maximum value and the minimum value among nine data which are acquired by measuring the heights of all nine points of a rectangular planar glass from a reference plane. The nine points includes four vertices on one surface of the glass, the midpoints of the four sides on the one surface of the glass, and the center of the one surface of the glass.

The left graph in FIG. 18 represents the warpage occurred when the chemical strengthening is performed after the CNC-machining without distinguishing between the first surface US and the second surface RS and without coating the protective film PF on the second surface RS.

The right graph represents the warpage occurred when the chemical strengthening is performed after CNC-machining the first surface US by distinguishing between the first surface US and the second surface RS by coating the protective film PF on the second surface RS according to the method for fabricating the glass article 100 in accordance with an exemplary embodiment.

The left graph shows both cases of CNC-machining the first surface US and CNC-machining the second surface RS. In the left graph, the average value of warpages was about 0.14 mm. In the case of the CNC-machining the second surface RS, the result data of the warpages were distributed in a range of about 0.15 mm to about 0.225 mm. In the case of the CNC-machining the first surface US, the result data of the warpages were distributed in a range of about 0.05 mm to about 0.13 mm.

In the right graph, as the result data in the case of CNC-machining the first surface US, the average value of the warpages was about 0.10 mm, and the overall result data were distributed in a range of about 0.08 mm to about 0.13 mm.

Therefore, when the first surface US and the second surface RS were distinguished using the protective film PF only on the second surface RS, the three-dimensional machining was performed only on the first surface US, and then chemical strengthening was performed, according to the method for fabricating the glass article in accordance with an exemplary embodiment, the dispersion of the warpages was decreased and the average value of the warpages was decreased.

Figure 19:
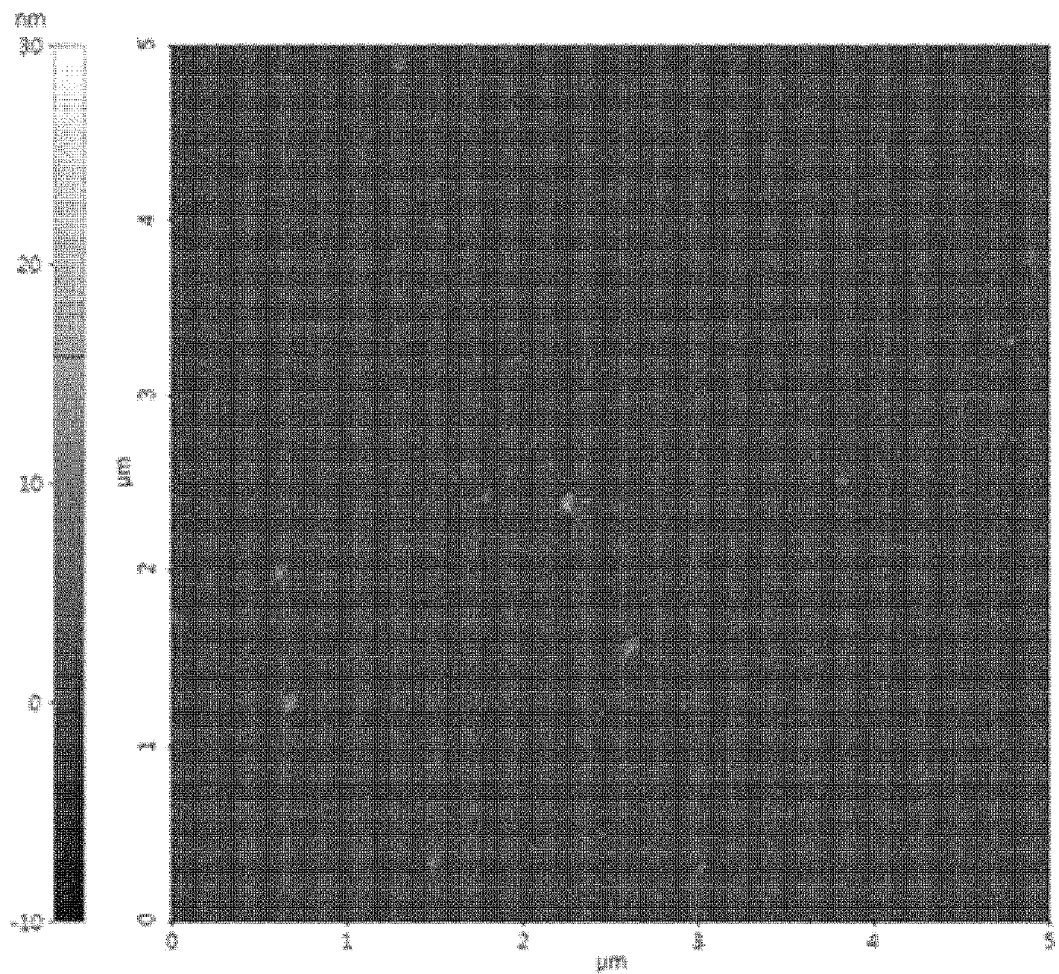
FIG. 19 is a photograph of a tin surface of a glass article fabricated by applying a protective coating according to an exemplary embodiment, which has been obtained by observing the tin surface with an atomic force microscope.
Figure 20:
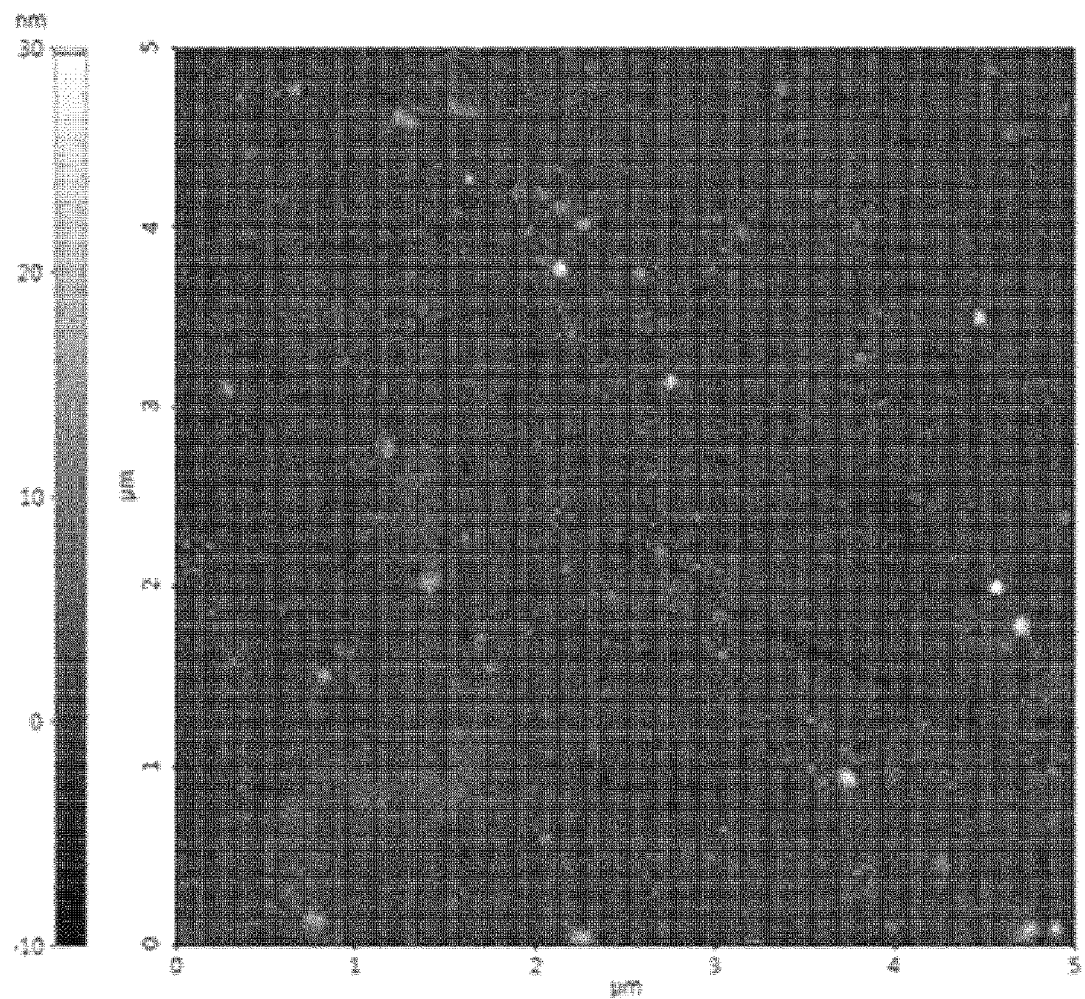
FIG. 20 is a photograph of a tin surface of a glass article fabricated without applying a protective coating, which has been obtained by observing the tin surface with the atomic force microscope.

FIG. 19 is a photograph of a tin surface of a glass article fabricated by applying a protective coating according to an exemplary embodiment, which has been obtained by observing the tin surface with an atomic force microscope. FIG. 20 is a photograph of a tin surface of a glass article fabricated without applying a protective coating, which has been obtained by observing the tin surface with the atomic force microscope.

Referring to FIGS. 19 and 20, FIG. 19 is the photograph of the second surface RS of the glass article 100 fabricated by applying the protective coating to the second surface RS, which has been obtained by observing the second surface RS with the atomic force microscope. As a comparative example, FIG. 20 is an atomic force micrograph of the second surface RS of the glass article 100 fabricated without applying the protective coating to the second surface RS.

As an experimental example, when the surface polishing step S6 before strengthening was performed in a state where the protective film PF was attached to the second surface RS, the second surface RS was not polished. On the other hand, as the comparative experimental example, when the surface polishing step S6 before strengthening was performed in a state where the protective film PF was not attached to the second surface RS, the second surface RS was polished.

When the surface of the glass 10 was polished, the surface roughness increased. The atomic force microscope may represent the surface roughness by a root mean square ("RMS") value. The surface roughness of a mother glass was 0.8 nm or less. Therefore, it is possible to determine whether polishing was performed or not based on the surface roughness of 0.8 nm.

In an exemplary embodiment, the surface roughness of the second surface RS of the glass article 100 fabricated by applying the protective coating had a value ranging from about 0.36 nm to 0.64 nm, an average of about 0.487 nm, and a standard deviation of 0.08. In this case, since the second surface RS was not polished, it showed the surface roughness similar to that of the mother glass.

In the comparative experimental example in FIG. 20, the surface roughness of the second surface RS of the glass article 100 fabricated without application of the protective coating had a value ranging from about 1.29 nm to 1.8 nm, an average of about 1.477 nm, and a standard deviation of 0.33. In this case, since the second surface RS was polished, the surface roughness thereof was increased compared to the mother glass. In addition, through the increase in the standard deviation, it can be found that the dispersion of the surface roughness in the case where the protective coating was not applied was greater than that in the case where the protective coating was applied.

Figure 21:
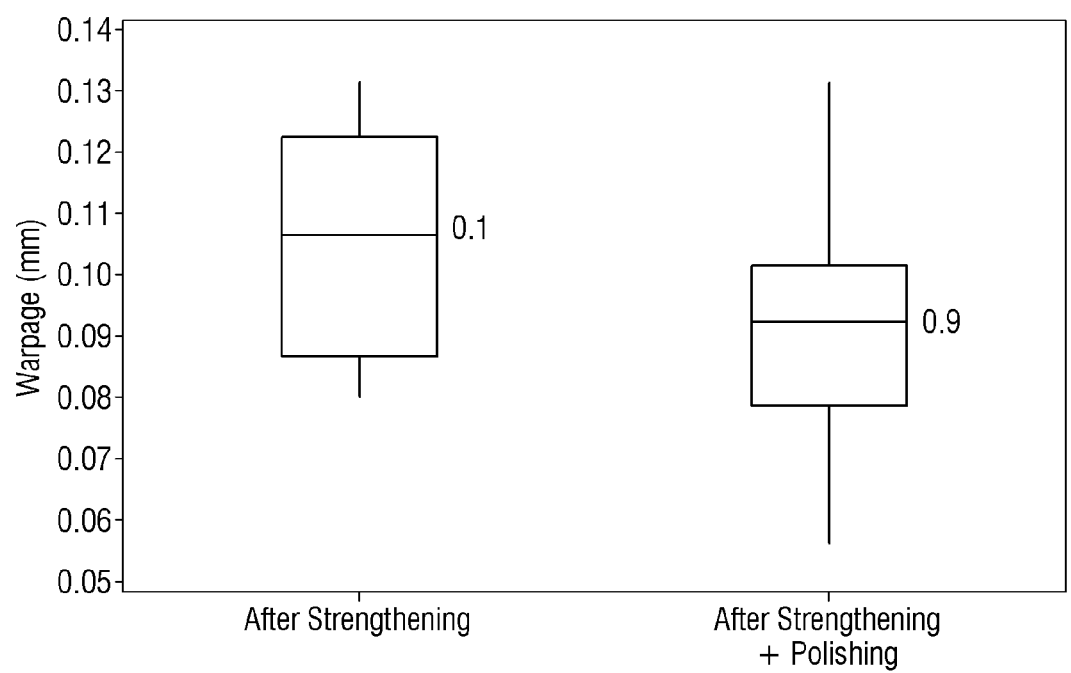
FIG. 21 illustrates graphs comparing warpages according to whether a polishing process after chemical strengthening was performed or not to glass article samples.

FIG. 21 illustrates graphs comparing warpages according to whether a polishing process after chemical strengthening was performed or not to glass article samples.

The polishing process after chemical strengthening targeted a glass article 100 subjected to attaching the protective film PF to the second surface RS to distinguish between the surfaces US and RS, three-dimensional machining of the first surface US, and chemical strengthening, according to the method for fabricating the glass article 100 in accordance with an exemplary embodiment.

Referring to FIG. 21, the left graph is for the glass article that was not subjected to the polishing process after chemical strengthening. Warpage data were distributed in a range of about 0.085 mm to about 0.122 mm, and the average value of the warpage data was about 0.10 mm.

The right graph is for a glass article that was subjected to the polishing process after chemical strengthening. Warpage data were distributed in a range of about 0.08 mm to about 0.10 mm and the average value of the warpage data was about 0.09 mm.

As a result of comparing the left and right graphs of FIG. 21, it can be seen that when the polishing process after chemical strengthening was performed to the glass article 100 that had been chemically strengthened, the warpage was reduced.

Figure 22:
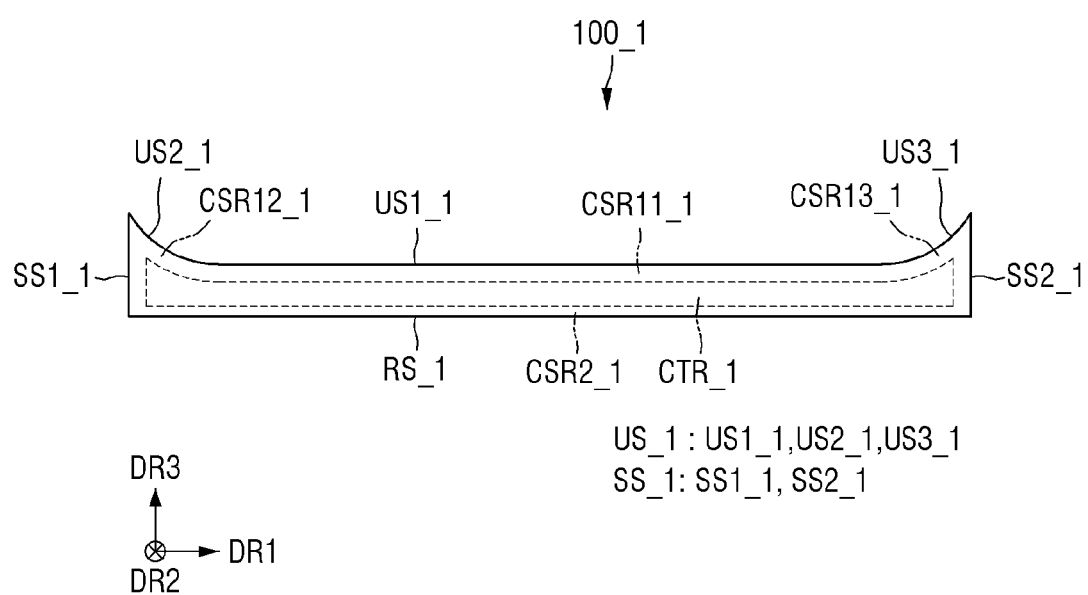
FIG. 22 is a cross-sectional view of a glass article according to another exemplary embodiment.

FIG. 22 is a cross-sectional view of a glass article according to another exemplary embodiment.

Referring to FIG. 22, a glass article 100_1 according to the present embodiment is different from the glass article 100 according to the embodiment of FIGS. 1 and 3 in that a first surface US_1 includes a center portion US1_1 and edge portions US2_1 and US3_1, and the edge portions US2_1 and US3_1 have rounded edge structures concave toward a second surface RS_1. Even in this case, the first surface US_1 and the second surface RS_1 may be connected by side surfaces SS_1, and the first surface US_1 and the side surfaces SS1_1 and SS2_1 may be non-tin surfaces and the second surface RS_1 may be a tin surface. The first surface US_1 including the center portion US1_1 and the edge portions US2_1 and US3_1, which is the non-tin surface, may have a surface area larger than that of the second surface RS_1 that is the tin surface. Due to tin ions, the second surface RS_1 may have a higher density of potassium (K) ions exchanged than the first surface US_1. Here, a first surface compressive region CSR11_1, a first side compressive region CSR12_1, a second side compressive region CSR13_1, a second surface compressive region CSR2_1, and a tensile region CTR_1 correspond to the first surface compressive region CSR11, the first side compressive region CSR12, the second side compressive region CSR13, the second surface compressive region CSR2, and the tensile region CTR, respectively.

In the glass article 100_1 according to the present embodiment, it is possible to distinguish between the upper and lower surfaces of the glass by protectively coating the second surface in which relatively active ion exchanges are performed and ion diffusion is blocked. Therefore, even if there is an area difference between the upper and lower surfaces US_1 and RS_1 (i.e., the first and second surfaces) of the glass article 100_1 by performing the CNC machining on the first surface US_1 as a front surface, it is possible to reduce warpage due to the stress imbalance in both surfaces US_1 and RS_1 of the glass article 100_1 in the chemical strengthening.

Figure 23:
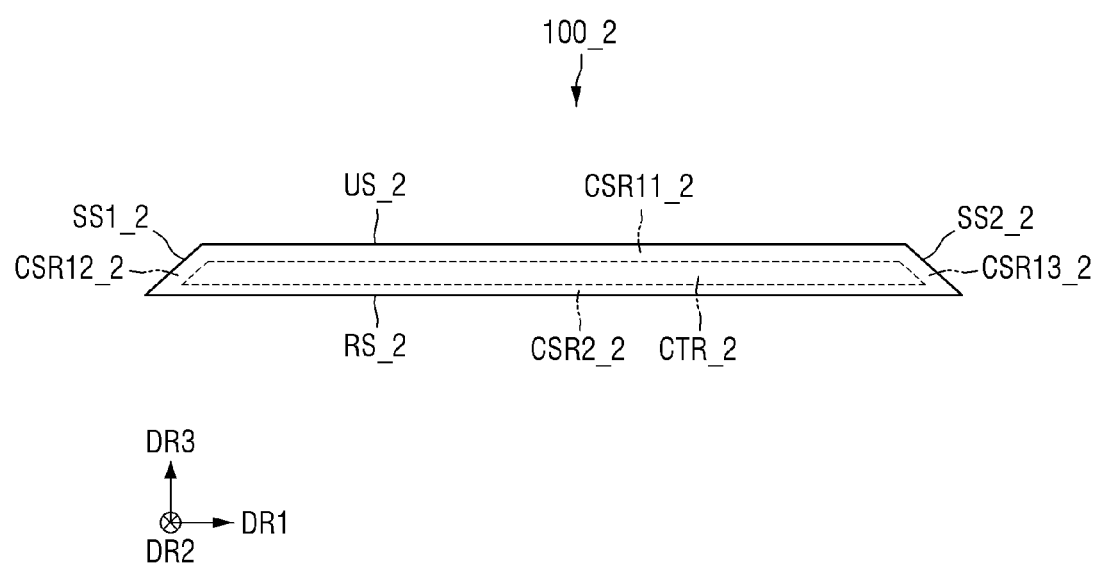
FIG. 23 is a cross-sectional view of a glass article according to still another exemplary embodiment.

FIG. 23 is a cross-sectional view of a glass article according to still another exemplary embodiment.

Referring to FIG. 23, a glass article 100_2 according to the present embodiment may include a first side surface SS1_2 and a second side surface SS2_2 connecting a first surface US_2 and a second surface RS_2, and the first and second side surfaces SS1_2 and SS2_2 are flat and inclined. The first surface US_2 and the side surfaces SS1_2 and SS2_2 may be non-tin surfaces, and the second surface RS_2 may be a tin surface. Even in this case, the non-tin surface including the first surface US_2 and the first and second side surfaces SS1_2 and SS2_2 may have a total surface area greater than that of the second surface RS_2 that is the tin surface. Due to tin ions, the second surface RS_2 may have a higher density of potassium (K) ions exchanged than the first surface US_2. Here, a first surface compressive region CSR11_2, a first side compressive region CSR12_2, a second side compressive region CSR13_2, a second surface compressive region CSR2_2, and a tensile region CTR_2 correspond to the first surface compressive region CSR11, the first side compressive region CSR12, the second side compressive region CSR13, the second surface compressive region CSR2, and the tensile region CTR, respectively.

In the glass article 100_2 according to the present embodiment, it is possible to distinguish between the upper and lower surfaces US_2 and RS_2 (i.e., the first and second surfaces) of the glass by protectively coating the second surface RS_2 in which relatively active ion exchanges are performed and ion diffusion is blocked. Therefore, even if there is an area difference between the upper and lower surfaces US_2 and RS_2 of the glass article 100_2 by performing the CNC machining on the first surface US_2 as a front surface, it is possible to reduce warpage due to the stress imbalance in both surfaces US_2 and RS_2 of the glass article 100_2 in the chemical strengthening.

Figure 24:
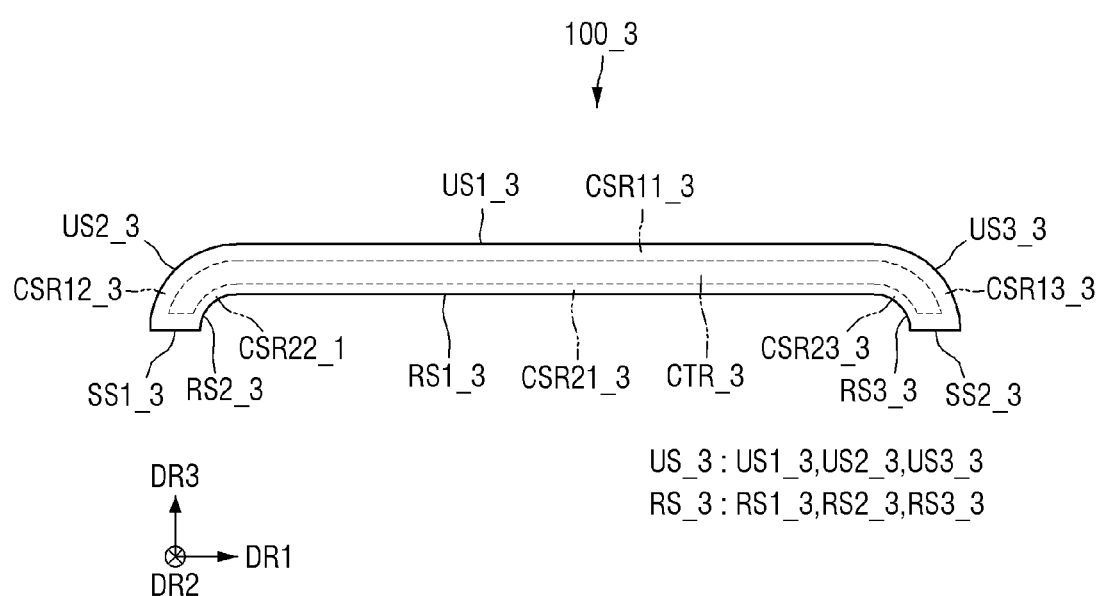
FIG. 24 is a cross-sectional view of a glass article according to still another exemplary embodiment.

FIG. 24 is a cross-sectional view of a glass article according to still another exemplary embodiment.

Referring to FIG. 24, in a glass article 100_3 according to the present embodiment, a first surface US_3 may include a center portion US1_3 and edge portions US2_3 and US3_3, and a second surface RS_3 may include a center portion RS1_3 and edge portions RS2_3 and RS3_3. Side surfaces SS1_3 and SS2_3 may connect the first surface US_3 to the second surface RS_3. Here, a first surface compressive region CSR11_3, a first side compressive region CSR12_3, a second side compressive region CSR13_3, a second surface compressive region CSR2_3, and a tensile region CTR_3 correspond to the first surface compressive region CSR11, the first side compressive region CSR12, the second side compressive region CSR13, the second surface compressive region CSR2, and the tensile region CTR, respectively.

The center portion US1_3 of the first surface US_3 and the center portion RS1_3 of the second surface RS_3 may each include a flat surface. The side surfaces SS1_3 and SS2_3 may be parallel to the center portion US1_3 of the first surface US_3 and the center portion RS1_3 of the second surface RS_3, but the present disclosure according to the invention is not limited thereto. The edge portions US2_3 and US3_3 of the first surface US_3 may include convex curved surfaces. The edge portions RS2_3 and RS3_3 of the second surface RS_3 may include concave curved surfaces. The first surface US_3 and the side surfaces SS1_3 and SS2_3 may be non-tin surfaces, and the second surface RS_3 may be a tin surface. Even in this case, the first surface US_3 that is the non-tin surface may have a surface area larger than the second surface RS_3 that is the tin surface. Due to tin ions, the second surface RS_3 may have a higher density of potassium (K) ions exchanged than the first surface US_3.

In the glass article 100_3 according to the present embodiment, it is possible to distinguish between the upper and lower surfaces US_3 and RS_3 of the glass by protectively coating the tin surface (i.e., the second surface RS_3) in which relatively active ion exchanges are performed and ion diffusion is blocked. Therefore, even if there is an area difference between the upper and lower surfaces US_3 and RS_3 of the glass article 100_3 by performing the CNC machining on the non-tin surfaces US_3, SS1_3, and SS2_3 as a front surface, it is possible to reduce warpage due to the stress imbalance in both surfaces of the glass article 100_3 in the chemical strengthening.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A glass article comprising:
a first surface, which is flat;
a second surface opposed to the first surface;
a side surface connecting the first surface to the second surface;
a first surface compressive region extending from the first surface to a first depth;
a second surface compressive region extending from the second surface to a second depth; and
a side compressive region extending from the side surface to a third depth,
wherein the first surface and the side surface are non-tin surfaces,
wherein the second surface is a tin surface, and
wherein a maximum compressive stress of the second surface compressive region is greater than a maximum compressive stress of the first surface compressive region,
wherein a total compressive energy of the first surface compressive region and the side compressive region is equal to a total compressive energy of the second surface compressive region.

2. The glass article of claim 1, wherein the first depth is greater than the second depth.

3. The glass article of claim 1, wherein a maximum compressive stress of the side compressive region is greater than the maximum compressive stress of the first surface compressive region.

4. The glass article of claim 1, wherein the side surface has an obtuse-angle inclination with respect to the first surface.

5. The glass article of claim 1, wherein at least a portion of the side surface includes a curved surface.

6. The glass article of claim 1, wherein the second surface compressive region includes a tin layer in contact with the second surface.

7. The glass article of claim 1, wherein a difference between the maximum compressive stress of the first surface compressive region and the maximum compressive stress of the second surface compressive region is within a range of about 5 megapascals (MPa) to about 15 MPa.

8. The glass article of claim 1, wherein a difference between the first depth and the second depth is within a range of about 0.01 micrometers (μm) to about 1.0 μm.

9. The glass article of claim 1, wherein an area of the first surface is smaller than an area of the second surface, and
  a sum of the area of the first surface and an area of the side surface is greater than the area of the second surface.

10. The glass article of claim 1, wherein compressive energy per unit volume of the second surface compressive region is greater than compressive energy per unit volume of the first surface compressive region.

11. The glass article of claim 1, wherein the maximum compressive stress of the first surface compressive region is equal to a maximum compressive stress of the side compressive region.

12. The glass article of claim 1, wherein a surface roughness of the tin surface is smaller than a surface roughness of the non-tin surface.

* * * * *